May 29, 1962  J. L. HEADRICK  3,036,813
VALVE
Filed May 28, 1959  2 Sheets-Sheet 2
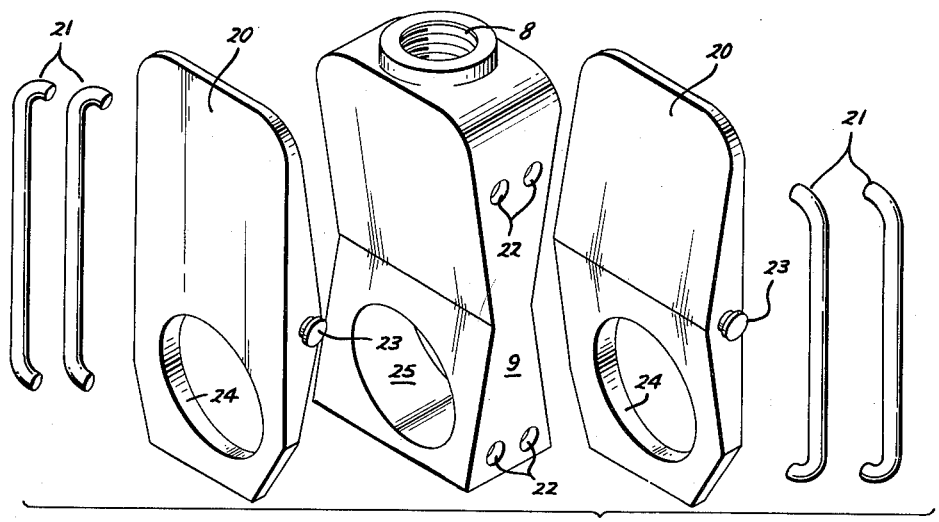
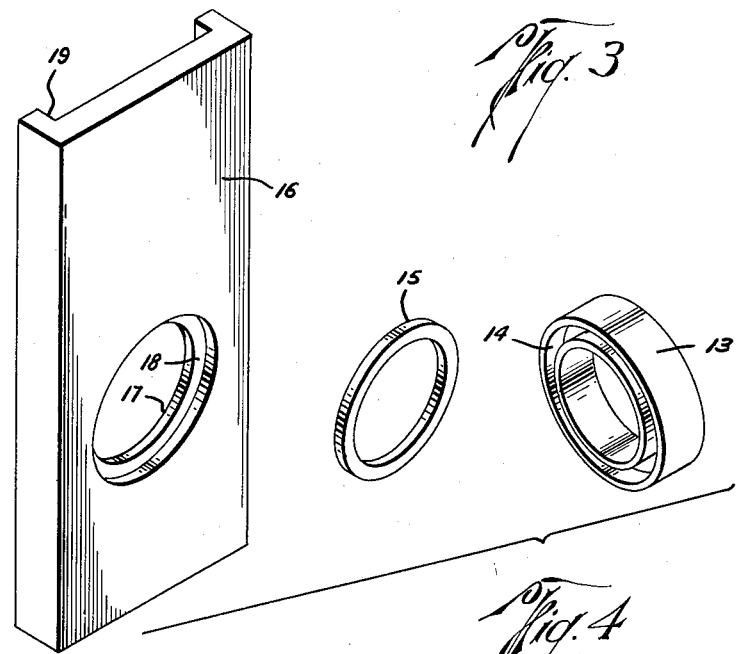
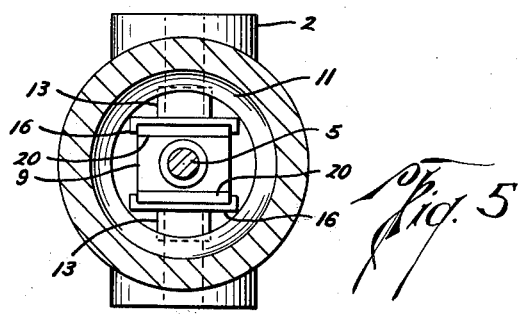
Jessie Lee Headrick
INVENTOR.
BY Ranseler O. Wyatt
ATTORNEY

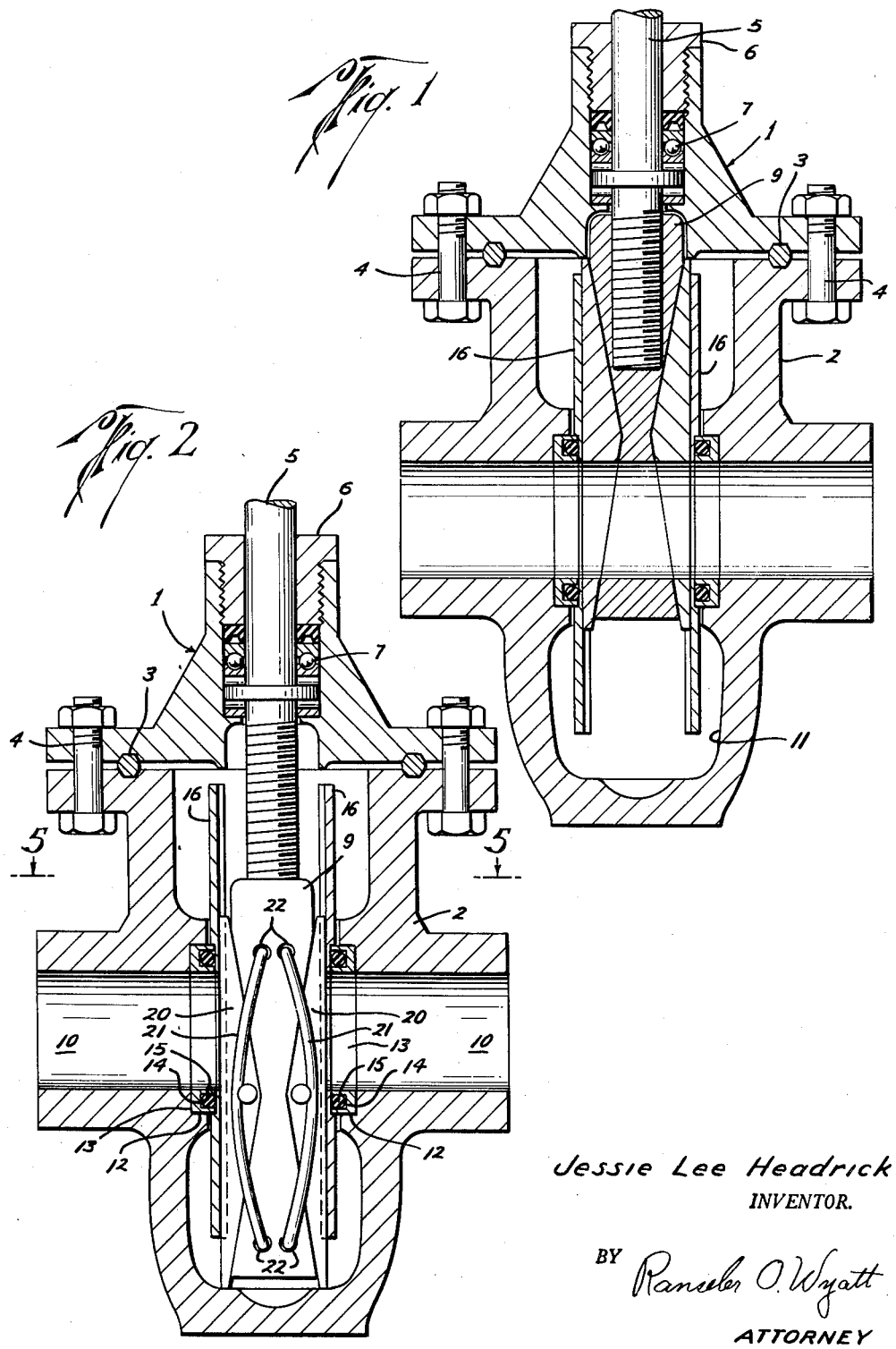
Jessie Lee Headrick
INVENTOR.
BY Ranseler O. Wyatt
ATTORNEY

3,036,813
VALVE
Jessie Lee Headrick, 505 Soren Lane, Houston, Tex.
Filed May 28, 1959, Ser. No. 816,423
3 Claims. (Cl. 251—196)

This invention relates to new and useful improvements in valve.

It is an object of this invention to provide a valve for use in pipe lines, such as high pressure well head control lines, and the like, having novel means for wedging the gate in open or closed position.

It is another object of the invention to provide a gate valve having novel spring mounted segments mounted to travel vertically in guide skirts and to move laterally against said skirts upon the extremity of vertical movement.

It is still a further object of the invention to provide a valve having novel means for quickly and easily relieving the sealing pressure on the gate when starting opening or closing movement of the valve. In pipe lines where the pressure is high, the drag on the pressure side of the valve causes great difficulty in moving the gate vertically to open or close the valve. It is an object of this invention to provide a valve having movable segments on the gate, that will permit the segments to be moved readily out of sealing position and against the gate horizontally, causing immediate equalization of pressure in the valve housing and the consequent elimination of drag on the valve.

With the above and other objects in view, the invention has relation to certain novel features of construction, operation and arrangement of parts more particularly defined in the following specification and illustrated in the accompanying drawings, wherein:

FIGURE 1 is an elevational side view of the valve in cross section, showing the valve in open position.

FIGURE 2 is an elevational side view of the valve partially in cross section, showing the valve in closed position.

FIGURE 3 is an exploded view of the gate and segments and the spring mounting means.

FIGURE 4 is an exploded view of a guide skirt and seat and O-ring, and

FIGURE 5 is a cross sectional end view taken on the line 5—5 of FIGURE 2.

Referring now more particularly to the drawings, the numeral 1 designates the usual valve bonnet attached to a valve housing 2, with the usual sealing means, as the packing 3, and the usual bolts 4, 4. A valve stem 5 is mounted in the bonnet 1 and has the usual closure 6 and packing means 7. The lower end of the stem 5 is externally threaded and screwed into the internally threaded port 8 of the gate 9.

The valve housing 2 is provided with the usual flow ports 10, 10 and gate chamber 11. The flow ports 10, 10 have internal annular grooves at their terminals in the gate chamber 11, as 12, 12, in which the annular seats 13, 13 are mounted. The seats 13, 13 each have an annular groove in one face thereof as 14, 14 in which suitable flexible O-rings 15, 15 are mounted.

Guide skirts as 16, 16 having ports 17, 17 and indentations 18, 18 are mounted in the chamber 11 by pressing the indentations onto the extended portion of the seats 13, 13. The guide skirts 16, 16 are channeled as at 19 on the face opposite the face having the indentations 18.

Mounted on the gate 9 are the segments 20, 20 which have their respective outer faces flat and which fit snugly in the channel 19 of the guide skirts 16, 16. The gate 9 is reduced midway its ends and tapers outwardly to a point adjacent each end thereof. The inner face of the segments 20, 20 is tapered inwardly from a point midway their respective ends to the respective ends thereof, and the inner face of the segments 20, 20 fit closely against the outer faces of the gate 9, and conform to the surface contour thereof. The segments 20, 20 are yieldably mounted on the gate 9 by means of suitable fasteners such as the springs 21, 21 which are inwardly turned at their respective ends forming projections which fit into suitable ports as 22, 22 in the gate 9. Each segment 20 has a flow port 24 in alignment with the flow port 25 of the gate 9. Suitable tension pins at 23, 23 are mounted in the side faces of the segments 20, 20 over which the springs 21, 21 are forced to maintain the segments 20, 20 in yieldable contact with the gate 9.

When the valve is in open position, as shown in FIGURE 1, and it is desired to close the valve, the stem 5 is rotated, and as the gate 9 moves downwardly, the springs 21, 21 will center the segments on the gate, and relieve the horizontal pressure against the skirts 16, 16, and the gate and segments will move easily downwardly until the bottom of the segments 20, 20, which extend beneath the gate 9, contact the bottom of the housing 2, and an additional turn of the stem 5 forces the segments 20, 20 to move outwardly, or horizontally, against the guide skirts 16, 16, forming a tight closure. When it is desired to open the valve, the stem 5 is rotated in the opposite direction, and as the gate moves upwardly, the springs 21, 21 will move the segments 20, 20 into centered position on the gate 9, permitting their easy vertical travel in the guide skirts 16, 16 and the gate and segments will be moved upwardly in the chamber 11 until the top of the segments 20, 20 contact the housing bonnet 1, stopping their upward movement, and an additional turn of the stem 5 will move the gate upwardly and the segments 20, 20 horizontally, against the skirts 16, 16, forming a tight closure.

The O-rings 15, 15 fit in the grooves 14, 14 so that only a small portion of the O-rings extend out of the grooves and contact the skirts 16, 16 thus assuring a tight, leak proof seal. The packing means 3, mounted in the bonnet on the housing 2, seals the chamber 11, making it fluid tight and if desired a suitable lubricant may be deposited in this chamber.

While the foregoing is considered a preferred form of the invention, it is by way of illustration only, the broad principle of the invention being defined by the appended claims.

What I claim is:

1. In a valve, a housing and detachable bonnet, a gate chamber in said housing, a valve stem through said bonnet and rotatable therein, the lower end of said stem being externally threaded, a gate in said gate chamber, said gate having an internally threaded socket in the upper end thereof into which said stem is mounted, the side faces of said gate being tapered outwardly from a point approximately midway of the respective ends thereof, segments yieldably mounted on said gate, said segments having one side face tapered outwardly from a point approximately midway of its respective ends, the opposing face of said segments being flat, said segments and gate having aligned transverse ports, a flow passageway through said housing, the terminals of said passageway within said chamber being annularly enlarged, annular seats mounted in said enlarged terminals and extending therefrom, annular grooves in the outer face of said seats, flexible O-rings in said grooves, guide skirts having annular indentations to receive the extended portions of said seats, a flowway through said skirts in alignment with the flow passageways of said housing, said guide skirts forming guides for the vertical movement of said gate and segments stop means for arresting movement of said segments near the end of the movement of said gate between its open and closed position so as to have said segments urged tightly against said skirts by further movement of said gate.

2. In a valve, a housing and detachable bonnet, a gate chamber in said housing, a valve stem through said bonnet and rotatable therein, the lower end of said stem being externally threaded, a gate in said gate chamber, said gate having an internally threaded socket in the upper end thereof into which said stem is mounted, a packing and a bearing in said bonnet, the side faces of said gate being tapered outwardly from a point approximately midway of the respective ends thereof, segments yieldably mounted on said gate, said segments having one side face tapered outwardly from a point approximately midway of the respective ends of said segments, the opposing face of said segments being flat, said segments and gate having aligned transverse ports, a flow passageway through said housing, the terminals of said passageway within said chamber being annularly enlarged, annular seats mounted in and partially extending from said enlarged terminals, annular grooves in the outer face of said seats, flexible O-rings in said grooves, guide skirts suspended from said seats having annular indentations to receive the extended portions of said seats, a flowway through said skirts in alignment with the flow passageways of said housing, said guide skirts forming guides for the vertical movement of said gate and segments, a pair of yieldable springs mounted on diametrically opposed sides of said gate, tension pins on said segments, said springs bearing against said pins to maintain each of said segments yieldingly in centered position on said gate stop means for arresting movement of said segments near the end of the movement of said gate between its open and closed position so as to have said segments urged tightly against said skirts by further movement of said gate.

3. In a valve, a housing, a bonnet detachably mounted on the housing, a stem mounted in and extending through said bonnet, a gate chamber in said housing, a gate vertically movable in said chamber and connected to one end of said stem, the side faces of said gate being tapered outwardly from a point approximately midway from the respective ends, a flow passageway through said housing and chamber, the terminals of said passageway within said chamber being annularly enlarged forming seat receiving grooves, annular seats mounted in said grooves, guide skirts mounted on said seats in the housing and extending above and below said flow passageway, said skirts having a bore in alignment with said flow passageway and an annular indentation in axial alignment with said bore and of greater diameter than said bore forming receiving sockets for the extended ends of said seats, yieldable packing mounted in the extended ends of said seats and bearing against the internal end faces of said indentations, said gate having a transverse port movable into alignment with said flow passageway, segments yieldably mounted on said gate, said segments having one side face tapered outwardly from a point approximately midway of the respective ends, ports in said segments in alignment with said ports in said gate, said segments being movable outwardly by said gate against said skirts when said gate is moved into extreme open or closed position and channels in said skirts to receive said segments and maintain said segments and gate in vertical alignment stop means for arresting movement of said segments near the end of the movement of said gate between its open and closed position so as to have said segments urged tightly against said skirts by further movement of said gate.

References Cited in the file of this patent

UNITED STATES PATENTS

| 2,002,780 | Laurent | May 28, 1935 |
| 2,150,254 | Sorensen | Mar. 14, 1939 |
| 2,192,331 | Schaefer | Mar. 5, 1940 |
| 2,583,512 | Laurent | Jan. 22, 1952 |
| 2,861,770 | Bredtschneider | Nov. 25, 1958 |
| 2,895,709 | Rattigair | July 21, 1959 |
| 2,906,491 | Young | Sept. 29, 1959 |

FOREIGN PATENTS

| 8,206 | Great Britain | 1900 |
| 718,329 | Great Britain | Nov. 10, 1954 |